United States Patent
Przytula et al.

(10) Patent No.: US 7,739,213 B1
(45) Date of Patent: Jun. 15, 2010

(54) METHOD FOR DEVELOPING COMPLEX PROBABILISTIC MODELS

(75) Inventors: Krzysztof W. Przytula, Santa Monica, CA (US); Tsai Ching Lu, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 421 days.

(21) Appl. No.: 11/715,068

(22) Filed: Mar. 6, 2007

(51) Int. Cl.
*G06N 5/02* (2006.01)
(52) U.S. Cl. ............................. 706/46; 706/18; 706/45; 706/52; 706/55; 706/61; 706/62; 714/25; 714/26
(58) Field of Classification Search .................. 706/17, 706/20, 21, 45, 46, 52, 61; 707/100, 102; 714/25, 37, 41
See application file for complete search history.

(56) References Cited

U.S. PATENT DOCUMENTS

| | | | |
|---|---|---|---|
| 5,802,256 A * | 9/1998 | Heckerman et al. ........... 706/59 |
| 6,408,290 B1 * | 6/2002 | Thiesson et al. ............... 706/52 |
| 6,879,973 B2 * | 4/2005 | Skaanning et al. ............ 706/52 |
| 6,973,459 B1 * | 12/2005 | Yarmus ...................... 707/102 |
| 7,158,958 B2 * | 1/2007 | Przytula et al. ............... 706/45 |
| 7,251,636 B2 * | 7/2007 | Chickering et al. ........... 706/12 |
| 7,272,587 B1 * | 9/2007 | Przytula ...................... 706/52 |
| 7,320,002 B2 * | 1/2008 | Chickering ................. 707/100 |
| 7,328,200 B2 * | 2/2008 | Przytula ...................... 706/52 |
| 2005/0091012 A1 * | 4/2005 | Przytula et al. ................ 703/2 |
| 2005/0160324 A1 * | 7/2005 | Przytula et al. ............... 714/43 |

OTHER PUBLICATIONS

Kraaijeveld, Pieter "GeNleRate: An Interactive Generator of Diagnostic Bayesian Network Models", Jun. 2005, pp. 1-72.*
Hiirsalmi, Mikko "Method Feasibility Study: Bayesian Networks", Oct. 2000, pp. 1-34.*

* cited by examiner

*Primary Examiner*—David R Vincent
*Assistant Examiner*—Omar F Fernandez Rivas
(74) *Attorney, Agent, or Firm*—Christie, Parker, Hale (57) ABSTRACT

A method and computer program product to capture expert knowledge and data using probabilistic models. A custom layered structure and nodes reduce the complexity of the model, allowing for representation of the model using tables. An editor is used for entry and verification of expert knowledge and data into tables and a probabilistic model is generated from the tables.

17 Claims, 5 Drawing Sheets

METHOD FOR DEVELOPING COMPLEX PROBABILISTIC MODELS

BACKGROUND OF THE INVENTION

This invention relates to the field of decision systems, and in particular, a method for developing probabilistic models, such as Bayesian networks.

Decision systems are generally used to capture expert knowledge and/or data, assisting a user of a decision system to make decisions based on the captured expertise. For example, manufacturers of automobiles, trucks, military vehicles, locomotives, aircrafts and satellites use decision systems to express diagnostic procedures. Decision systems can also be used for medical diagnosis, intelligence data analysis, web applications such as collaborative filtering and data retrieval, and for military applications such as battlefield management and enemy command structure identification and disruption.

One way to represent and/or implement decision systems is through probabilistic models, such as Bayesian networks. Bayesian networks are graphs consisting of nodes which are connected by directed arcs and are parametrized using probabilities. However, Bayesian networks do not contain closed loops or "cycles."

The nodes of a decision Bayesian network represent observations and conclusions while the directed arcs express causal dependencies between the conclusions (e.g., failure diagnoses) and observations (e.g., tests). Bayesian networks can be used to generate decision procedures by means of an inference algorithm. Particularly, an inference algorithm can recommend a sequence of observations and, finally, a conclusion. For each step along the way, the inference algorithm can provide a ranked list of next observations based on prior observation results. The user is expected to choose the top ranking observation recommendation, but is not limited to it. A lower ranked recommendation can be selected if the user cannot or does not want to follow the top recommendation.

To provide a simple illustration, a decision system could aid an automobile mechanic with diagnosing technical problems of an automobile. For example, confronted with an automobile that fails to start, the systems could suggest to begin troubleshooting by checking the battery. Traditional decision systems using inflexible data structures (such as decision trees) often require users to adhere to a fixed sequence of suggested tests with little room for skipping tests or alternating their order. However, when using probabilistic networks, a system can support several courses of action. For example, the automobile diagnosis decision system could, in addition to suggesting checking the battery, include lower ranked observations, e.g., checking the starter, the ignition, or the fuel supply. For example, the mechanic might know that the battery tester is being used at the moment and prefer to check the spark plugs first. Depending on the outcome of this test, the system could then recommend the next best test.

Probabilistic models do not only offer increased flexibility but are also easier to modify and some classes of probabilistic models only grow linearly in size with the amount of tests contained in a decision system. Moreover, capturing expertise using a probabilistic model can be made significantly less complicated than when using inflexible data structures, such as decision trees, especially when the domain of expertise is complex and the amount of observations and conclusions is high (such as over 1000). Often, an expert must be assisted by a knowledge engineer to capture her knowledge using a probabilistic model. As a result, many experts still prefer using inflexible data structures, such as decision trees, to capture their knowledge and/or data.

Therefore, there is a need for a more efficient, less complicated method for developing probabilistic models capturing complex domains of knowledge and/or data.

SUMMARY OF THE INVENTION

The present invention provides a novel approach to capturing expert knowledge and/or data using probabilistic models. The invention uses a custom, layered structure and custom nodes to reduce the complexity of the model.

In one embodiment of the invention, a method for capturing expert knowledge and/or data includes entering expert knowledge and/or data into one or more tables, wherein each of the one or more tables may be two-dimensional, and using the one or more tables to generate a probabilistic model that captures the entered expert knowledge and data, wherein the probabilistic model includes a structure of layers of nodes.

In one aspect of the embodiment, the structure may include a conclusion layer, an evidence layer, and one or more directed arcs, each directed arc originating at a node of the conclusion layer and ending at a node of the evidence layer.

In another aspect of the embodiment, the structure may include a conclusion layer, an evidence layer, one or more grouping layers of increasing levels, and a first set of one or more directed arcs, each directed arc of the first set originating at a node of the conclusion layer and ending at a node of a grouping layer of a first level; if there is more than one grouping layer, a second set of one or more directed arcs, each directed arc of the second set originating at a node of a first grouping layer of any level and ending at a node of a second grouping layer of any level, wherein the level of the first grouping layer is one less than the level of the second grouping layer; and a third set of one or more directed arcs, each directed arc of the third set originating at a node of the conclusion layer or at a node of any of the grouping layers, and ending at a node of the evidence layer.

In another embodiment of the invention, a computer program product for capturing expert knowledge and/or data includes computer readable program code with an interface for entering expert knowledge and/or data into one or more tables, wherein each of the one or more tables may be two-dimensional, and computer readable program code using the one or more tables to generate a probabilistic model that captures the entered expert knowledge and data, wherein the probabilistic model includes a structure of layers of nodes.

In one aspect of the embodiment, the structure may include a conclusion layer, an evidence layer, and one or more directed arcs, each directed arc originating at a node of the conclusion layer and ending at a node of the evidence layer.

In another aspect of the embodiment, the structure may include a conclusion layer, an evidence layer, one or more grouping layers of increasing levels, and a first set of one or more directed arcs, each directed arc of the first set originating at a node of the conclusion layer and ending at a node of a grouping layer of a first level; if there is more than one grouping layer, a second set of one or more directed arcs, each directed arc of the second set originating at a node of a first grouping layer of any level and ending at a node of a second grouping layer of any level, wherein the level of the first grouping layer is one less than the level of the second grouping layer; and a third set of one or more directed arcs, each directed arc of the third set originating at a node of the conclusion layer or at a node of any of the grouping layers, and ending at a node of the evidence layer.

In yet another embodiment of the invention, an editor for entering expert knowledge and/or data includes an interface for editing one or more tables usable for generation of a probabilistic model, wherein each of the one or more tables may be two-dimensional. The interface may further include at least one view corresponding to a conclusion layer of the probabilistic model and at least one view corresponding to an evidence layer of the probabilistic model. The interface may further include a plurality of views displaying different degrees of detail. The editor may further comprise one or more tools for data sorting and/or data checking.

In yet another embodiment of the invention, a method for generating probabilistic models includes receiving one or more tables, wherein each of the one or more tables may be two-dimensional, representing expert knowledge and/or data, and generating a probabilistic model from the one or more tables including generating a structure of layers of nodes and generating directed arcs between nodes of non-identical layers. Values may be assigned to each of the directed arcs. The generator may further include generating a conclusion layer for inclusion in the probabilistic model, the conclusion layer including one or more conclusion nodes, and generating an evidence layer for inclusion in the probabilistic model, the evidence layer including one or more evidence nodes. The generator may further include generating one or more grouping layers for inclusion in the probabilistic model, each grouping layer including one or more group nodes, wherein each group node represents a set of evidence.

DETAILED DESCRIPTION OF THE INVENTION

The present invention provides a method, as well as tools, for the development of probabilistic models that is generally simpler, more efficient, more robust and faster than prior art methods, particularly when the pertinent probabilistic model is large in size, such as involving more than 1000 nodes. A software system in accordance with the present invention is usable for large networks, including networks with over 2000 nodes, and may be deployed in commercial decision support.

In particular, the following disclosure includes at least two facets implementing the present invention, each of which considerably enhance prior methods of compiling information in probabilistic models: for one, a custom, layer-structured, probabilistic model using custom nodes and a method for generating such models from generally significantly less complicated tables is disclosed; secondly, software tools utilizing the aforementioned method are disclosed.

The disclosed invention offers multiple advantages over traditional, prior art methods: A domain expert, e.g., a diagnosis expert, taking advantage of the inventive method and/or the herein disclosed pertinent tools may independently create a Bayesian Network model of her knowledge without the assistance of a knowledge engineer, i.e., a Bayesian network expert. The pertinent information may also be collected faster and may be less error-prone than traditional, prior art methods. The layered network structure and use of custom nodes may further reduce the amount of necessary parameters compared to general, non-layer-structured networks. Moreover, initial checking of the entered information may be performed using simple manipulations of tables rather than checking a significantly more complex and less human-readable graphical probabilistic model. In fact, the tables may be the only representation of the information that need to be reviewed and/or examined by a domain expert. A probabilistic model may be created automatically from the tables. Furthermore, during conversion, automated checking may be performed. Finally, the automatically created probabilistic model may be optimized for computational performance.

Figure 1:
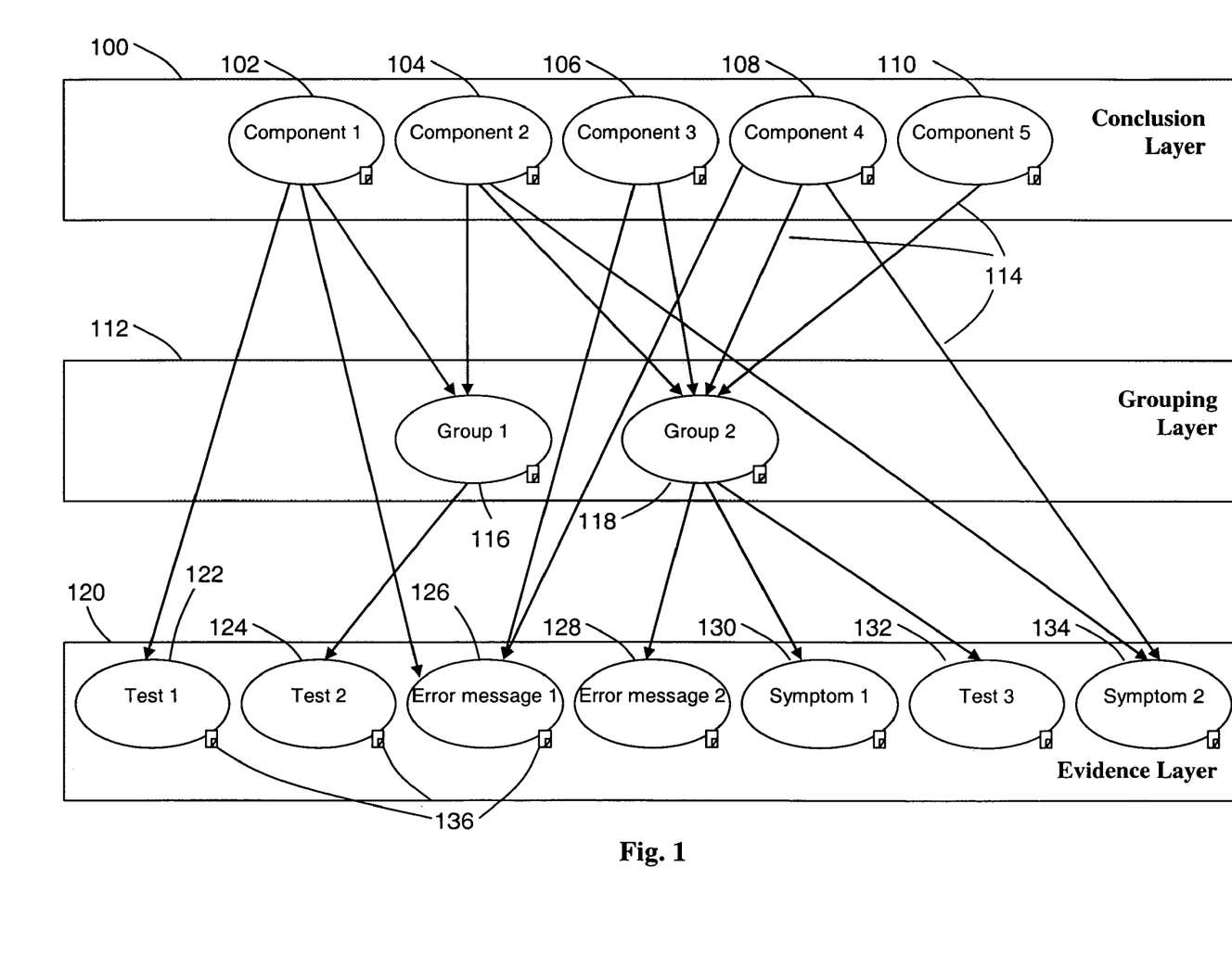
FIG. 1 shows a sample Bayesian network structure as may be generated in accordance with the present invention.

FIG. 1 shows an example of a probabilistic model structure in accordance with the present invention. FIG. 1 shows a Bayesian network with three layers: a conclusion layer 100, a grouping layer 112 and an evidence layer 120. Each layer respectively contains nodes 102-110, 116-118, 122-134.

The nodes are connected by directed arcs 114 to create a network. All directed arcs 114 originate at a node of one layer and end at a node of another layer, i.e., no directed arc 114 originates and ends at a node of a same layer. Also, all directed arcs 114 originate at a node 102-110 of the conclusion layer 100 or a node 116, 118 of a grouping layer 112. FIG. 1 only shows one grouping layer 112 for illustrative purposes. However, a probabilistic model in accordance with the present invention may have more than one grouping layer 112.

All directed arcs also end either at a node 122-134 of the evidence layer 120 or at a node 116, 118 of a grouping layer 112. If a directed arc 114 originates at the conclusion layer 100, it may end either at a node 122-134 of the evidence layer 120 or at a node 116, 118 of any grouping layer 112. However, if a directed arc 114 originated at a node 116, 118 of a grouping layer 112, it may end at a node 122-134 of the evidence layer 120, or, if the network contains several grouping layers, at a grouping layer of a higher level, with levels increasing counting from the grouping layer closest to the conclusion layer, to the grouping layer closest to the evidence layer. Hence, in a representation such as FIG. 1, all arcs 114 are oriented in top-to-bottom direction. One effect of using such structure is the exclusion of cycles.

Nodes generally have states and are annotated 136 with prior and conditional probabilities. For each node 116, 118, 124, 132 with multiple incoming directed arcs 114, the annotation 136 specifies conditional probabilities for all of a node's states given all combinations of states of the "parent" nodes 102, 104, 106, 108, 110 where the arcs 114 originated. For purposes of this specification, a node where a directed arc originates is referred to as a "parent node" of the node where the arc ends, which is referred to as the parent node's "child node." For example, node 118 has four parent nodes 104, 106, 108, 110. Hence, annotation 136 of node 118 specifies conditional probabilities for all the node's 118 states given the combinations of states of its parent nodes 104, 106, 108, 110.

Generally, probabilistic models may be used to capture expert knowledge and/or data in general. The present invention is amenable to both. The following description focuses on how experts can capture knowledge and data:

An exemplary approach in accordance with this invention uses the above-described custom layered network structure and custom node types. Possible decisions/conclusions are represented by the conclusion layer 100 while evidence usable to make the decisions are captured by the evidence layer 120. The structure also allows for additional layers 112 that represent groupings of decisions and/or conclusions 116, 118. For example, in a diagnostic system, the conclusion layer 100 represents diagnosed components, whereas subsystems consisting of multiple components may be represented by nodes 116, 118. As mentioned before, FIG. 1 shows only one grouping layer for illustrative purposes, but a network structure in accordance with the present invention may include one or more grouping layers.

The regularity of the resulting structure allows for use of editors that do not require graphical representation of the network but may instead consist of an interface of two- or more dimensional tables, such as the one shown in FIG. 4, which is described in more detail later. At the same time, the structure may be flexible and powerful enough to express complex decision domains.

Figure 2:
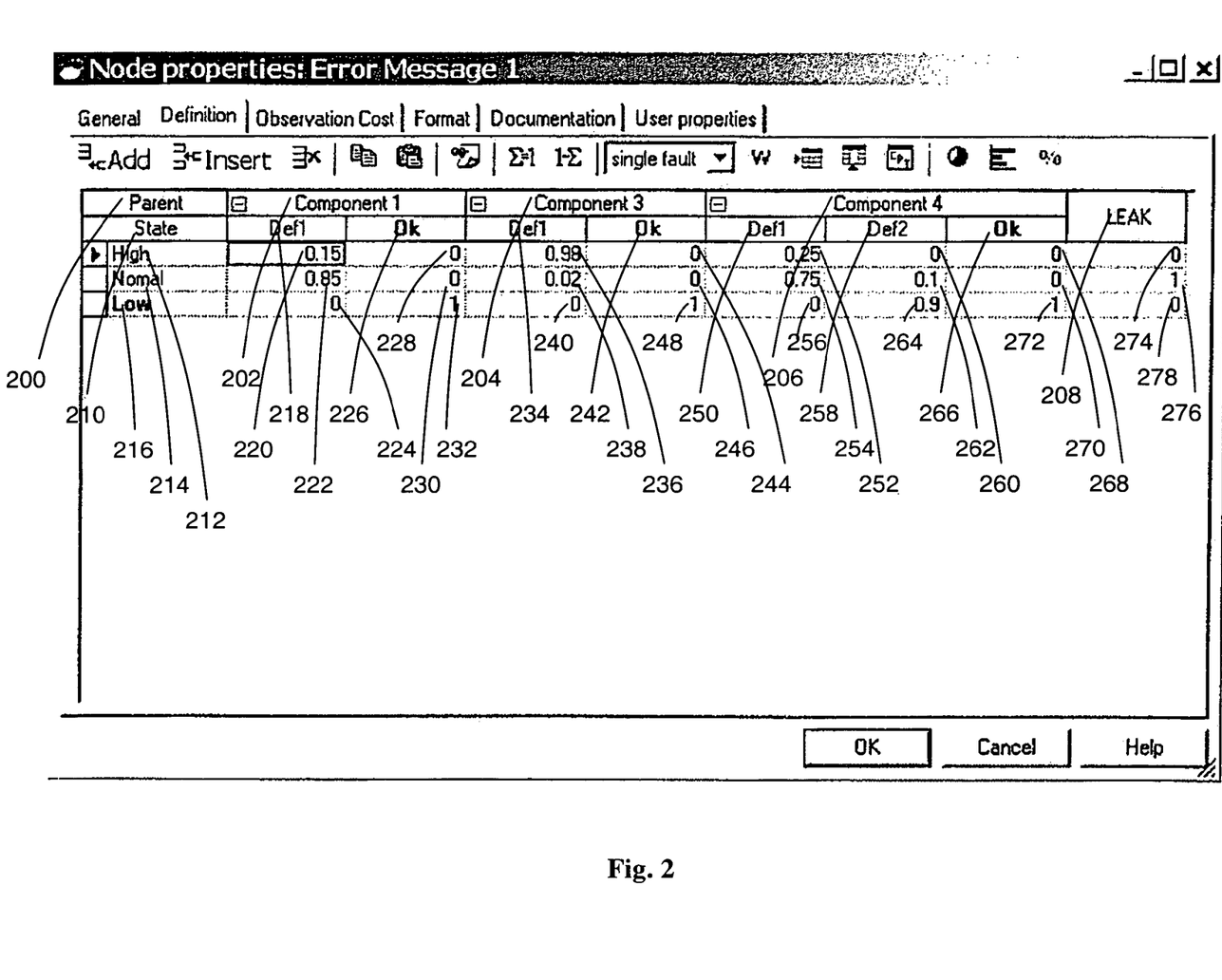
FIG. 2 shows a software application window displaying properties of a sample custom "Noisy-Adder" node in accordance with the present invention.

The efficiency of this layered network structure may be increased even further by the use of custom node types, e.g., instead of using general nodes based on general conditional probability tables, evidence layer 120 nodes 122-134 may be custom "noisy" nodes, such as custom noisy nodes types Noisy-OR or Noisy-MAX as already known from the prior art (see, e.g., the GeNIe graphical network interface software package available from the University of Pittsburgh), as well as the inventive custom noisy node type "Noisy-Adder," for which a view of some of its properties is disclosed in FIG. 2.

The inventive custom noisy node type "Noisy-Adder" may account for multiple-state observation where the presence of multiple causes may push the state of observation in different directions: For example, presume that node 126 of the Bayesian network shown in FIG. 1, which is labeled "Error Message 1," represents a fuel pressure value. Presume further that the node properties displayed in FIG. 2 belong to this node, showing three possible states 210 of the node: "high" 212, "normal" 214, and "low" 216.

Defective state "Def1" 218 of "Component 1" 202, pushes the fuel pressure value toward "high" 212 with a probability of "0.15" 220, toward "normal" 214 with a probability of "0.85" 222, and toward "low" 216 with a probability of "0" 224. Defective state "Def1" 234 of "Component 3" 204 pushes the fuel pressure value toward "high" 212 with a probability of "0.98" 236, toward "normal" 214 with a probability of "0.02" 238, and toward "low" 216 with a probability of "0" 240. Defective state "Def1" 250 of "Component 4" 206 pushes the fuel pressure value toward "high" 212 with a probability of "0.25" 252, toward "normal" 214 with a probability of "0.75" 254, and toward "low" 216 with a probability of "0" 256. Furthermore, defective state "Def2" 258 of "Component 4" 206 pushes the fuel pressure value toward "high" 212 with a probability of "0" 260, toward "normal" 214 with a probability of "0.1" 262, and toward "low" 216 with a probability of "0.9" 264.

Hence, when a fuel pressure value state of "high" 214 is observed, a defective state of type "Def1" 218, 234, 250 of "Component 1" 202, "Component 3" 204 or "Component 4" 206 may be responsible in proportion of the pertinent probabilities 220, 236, 252. In turn, if a fuel pressure value state of "low" 216 is observed, the only available culprit is a defective state "Def2" 258 of "Component 4" 206 with a probability of "0.9" 264. However, in a case where "Component 4" 206 has a defective state "Def2" 258 but "Component 3" 204 has a defective state "Def1" 234 at the same time, the fuel pressure value state 210 will likely be observed as "normal" 214, as the two defective states push the fuel pressure value state 210 in opposite directions. In such a case, the inventive custom noisy node type "Noisy-Adder" assumes that the observation will indeed be a "normal" 214 state, regardless of the exact probabilities 236, 264 of the opposite causes.

Noisy nodes of type "Noisy-OR," "Noisy-Max" and "Noisy-Adder" generally require fewer parameters than general nodes as a result. The complexity of their conditional probability tables may therefore be a linear function of the number of parent nodes, compared to the generally exponential growth in the case of general nodes. Referring back to FIG. 1, for grouping layers 112, deterministic nodes 116, 118 representing logical functions (such as OR or AND) may be used to simplify the specification of the grouping layers 112.

Figure 3:
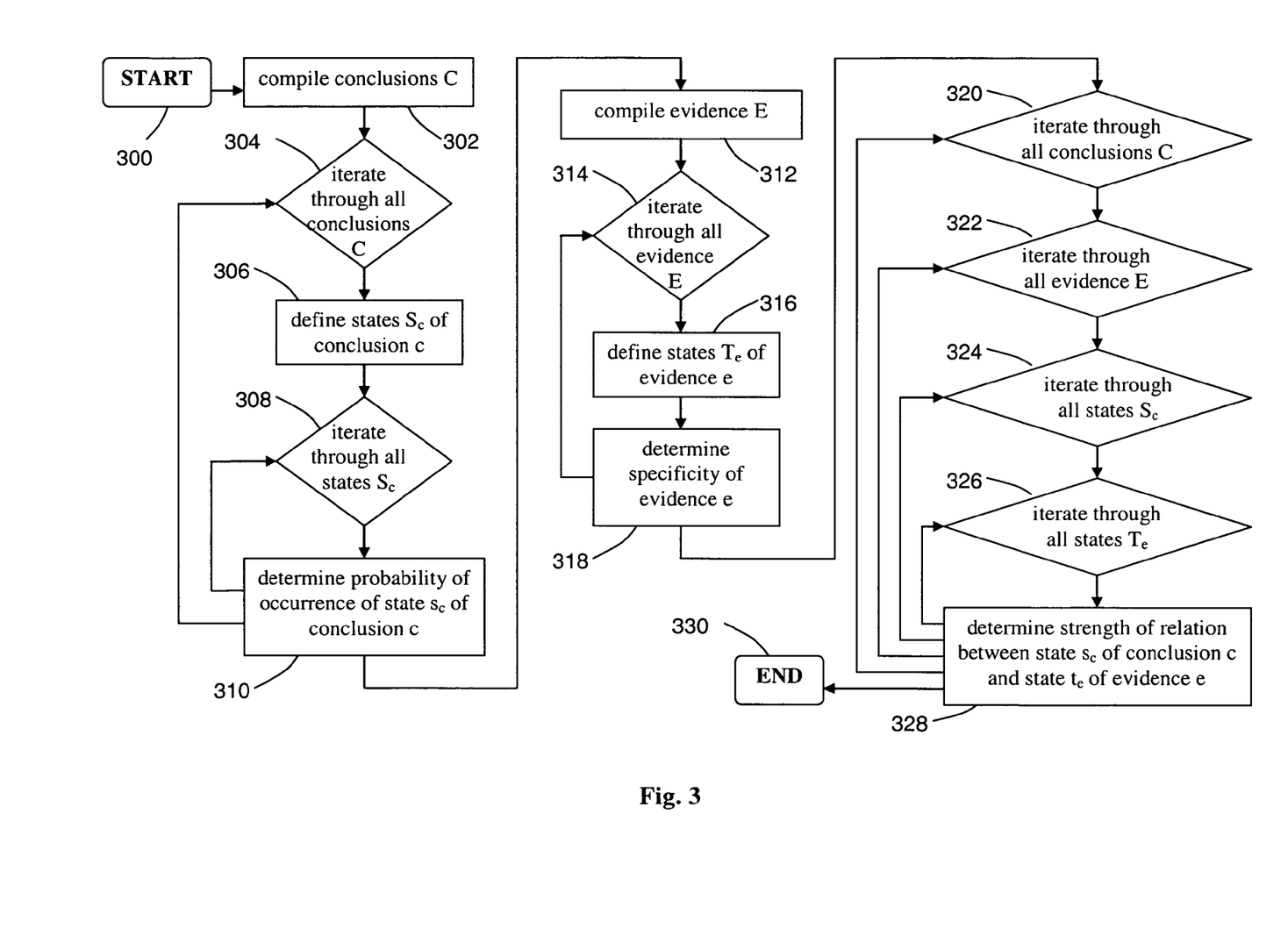
FIG. 3 shows a flow chart of a method for generating a Bayesian network in accordance with the present invention.

FIG. 3 shows a flow chart representing an exemplary method for generating a probabilistic network of a structure in accordance with the present invention. An example of such a structure is depicted in FIG. 1, which has already been described above.

In the exemplary method represented in FIG. 3, a set of possible conclusions C is compiled first 302. The method then calls for iterating 304 through the compiled conclusions c of the set C, defining 306 the set $S_c$ of states $s_c$ for each conclusion c. Within each iteration 304 through the compiled conclusions c of the set C, the method further calls for iterating 308 through the states $s_c$ of the set of states $S_c$ of each conclusion c, while determining 310 the probability of occurrence of each state $s_c$ of the set of states $S_c$ of each conclusion c. For example in a diagnostic system, the conclusions C may represent replaceable components, their states may be the components' failure modes, and the probabilities may be the components' failure rates.

After the conclusions have been compiled 302 and iterated through 304, 308, a set of items of evidence E may be compiled 312. The method then calls for iterating 314 through items of evidence e of the set of evidence E, while defining 316 the set $T_e$ of states $t_e$ of each item of evidence e. During the same iterations 314, the method may determine 318 the specificity of each item of evidence e of the set E. For example in a diagnostic system, the items of evidence may include symptoms, built-in-tests and/or manual tests, and the items' specificity may be a rate of false positive test results.

After the conclusions and the items of evidence have been compiled 302, 312 and iterated through 304, 308, 314, the strength of the relation, also referred to as "sensitivity," between each pair of conclusion state $s_c$ and evidence state $t_e$ may be determined 328. This may be accomplished by iterating 320 through the conclusions c of the set C, within each iteration 320 iterating 322 through the items of evidence e of the set E, within each iteration 322 iterating 324 through the states $s_c$ of the set $S_c$, within each iteration 324 iterating 326 through the states $t_e$ of the set $T_e$, and determining 328 the strength of the relation (sensitivity) between each pair of conclusion state $s_c$ and evidence state $s_c$ within each iteration 326 of the innermost loop. For example, in a diagnostic system, relations may be defined between failure modes and the test results that they can cause. The strength of each relation (sensitivity) may be the rate of true positives, i.e., the percentage of failure modes that lead to the test result.

It will be understood by one reasonably skilled in the art that the hierarchy of iterations shown in FIG. 3 may be changed while achieving the same result, such as iterating 322 through the set of items of evidence E in the outermost loop and iterating 320 through the set of conclusions C in an inner loop, or by similarly changing the hierarchical order of the iterations 324, 326 through the states of the conclusions and items of evidence, respectively. Similarly, compiling 312 and iterating 314 through evidence before compiling 302 and iterating 304, 308 through conclusions may lead to equal results. Moreover, one reasonably skilled in the art will appreciate that this approach may be optimized in many ways, particularly with regard to increasing the efficiency of the method, for example by avoiding four levels of nesting of iterations as well as by skipping irrelevant state combinations or possibly estimating strengths of relations. Many further ways of optimizing nested loops are known in the art and are hereby included within the scope of the invention without being listed individually. The straight-forward approach of iterating through pairs of conclusion states and evidence states $s_c$, $t_e$ shown in FIG. 3 was merely chosen for simplicity of illustration.

To include grouping layers 112 as shown in the exemplary network structure of FIG. 1, the method illustrated in FIG. 3 may include not only items of conclusion but also groups of items of conclusion 116, 118. In a diagnostic system, these groups may represent subsystems, such as a fuel supply subsystem in an automobile. An example of an item of evidence relating to such a subsystem may be a fuel leak, which constitutes an item of evidence common to all components of the system.

Figure 4:
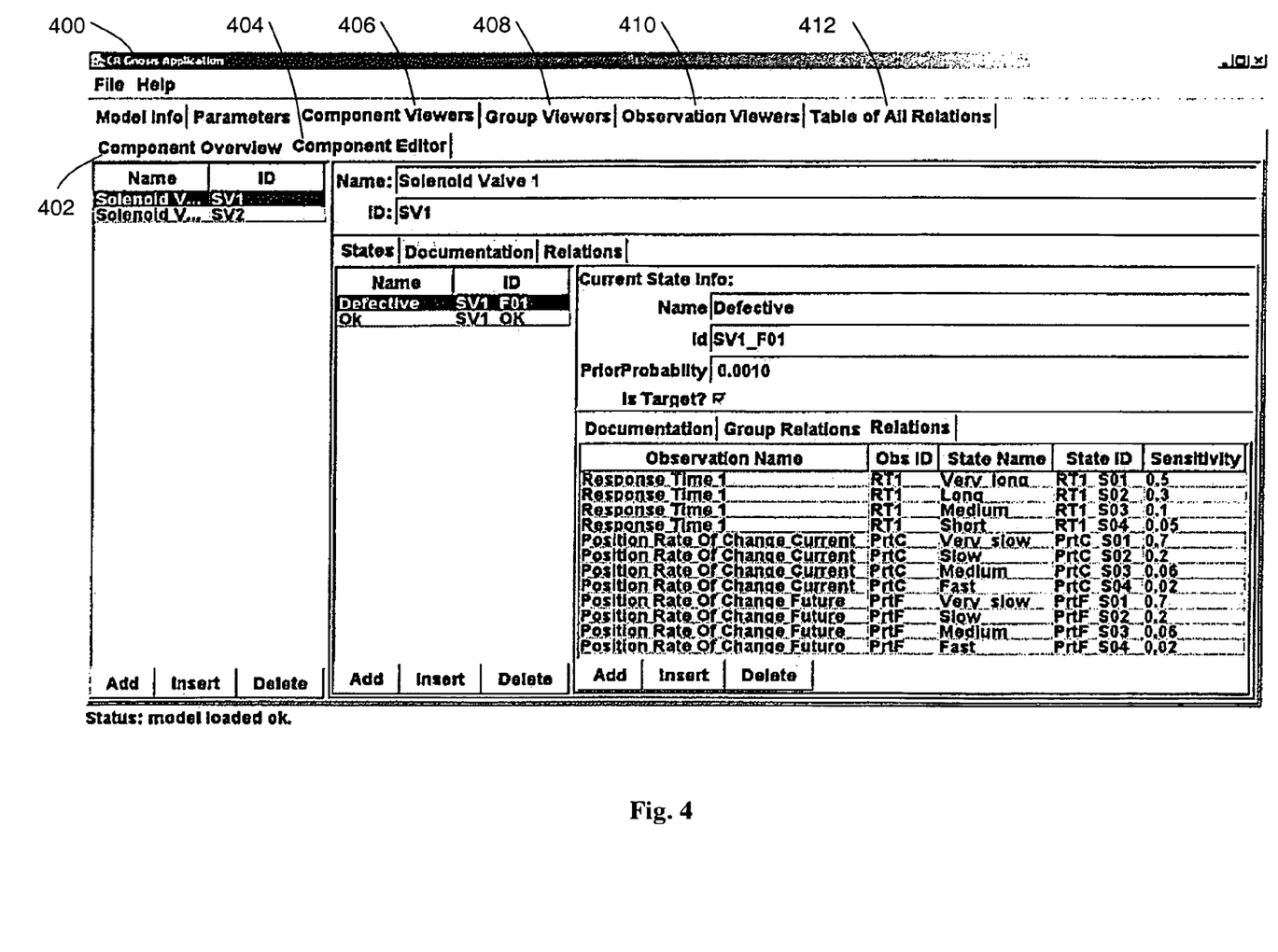
FIG. 4 shows a view of an editor usable to enter data in accordance with the present invention.

FIG. 4 shows a view of a window 400 of an editor for entering expert knowledge and/or data into tables. The shown view includes a component overview 402 and the component editor 404. The editor has separate view tabs for components (representing conclusions) 406, observations (representing evidence) 410, groups of evidence 408, and relations 412. The editor may further allow for multiple sub-views or filtering of each of these views to allow display of different degrees of detail.

The editor may be tailored to the custom layered network structure and/or the custom nodes described above and illustrated in FIG. 1 and FIG. 2. The view tabs may follow the steps of the network generation method procedure described above and illustrated in FIG. 3, and the editor may assist with data entry and verification. The editor may further include tools for data sorting and checking. A simple example would be to check that individual probabilities only range between 0 and 1 (representing probabilities between 0% and 100%) and that the sum of probabilities of conclusion states with regard to a single conclusion equals 1 (100%). The editor's language and display formats may further be customized to reflect needs of a particular domain.

Figure 5:
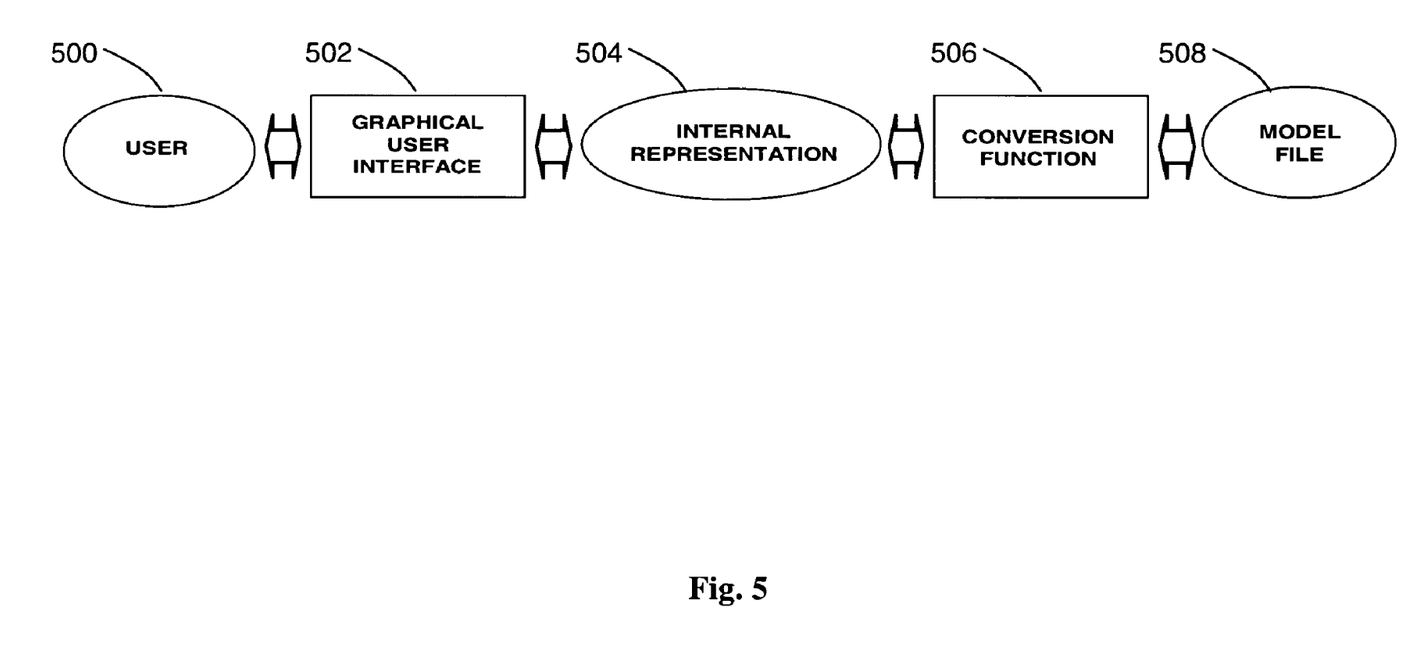
FIG. 5 shows an overview of data representations of probabilistic networks as may be used in a software system in accordance with the present invention.

FIG. 5 shows an example of how a probabilistic network may be represented and/or stored in different formats in a software system in accordance with the present invention. The user of the system 500 may use a graphical user interface 502, such as the editor described above and illustrated in FIG. 4, to enter data, which may represent expert knowledge and/or data. This data may then be stored by the software system using an internal representation of choice 504, possibly tailored to the nature of the graphical user interface. For example, the internal representation may be a data structure that allows for quick displays of the stored information in the editor views and speedy storage, checking and verification of newly entered or modified data. Such internal representations may include known data structures and/or database systems of the prior art, which are hereby included within the scope of the invention without being listed individually. The internal representation of the data 504 may then be converted 506 into a probabilistic model file 508, which may be formatted in accordance with probabilistic model reasoning engines. Such formats may include the GeNIe format supported by the graphical network interface software package available from the University of Pittsburgh, or formats used by the commercial Hugin Expert A/S software suite. During the conversion 506, further data checking and verification may be performed, including checking of data correctness.

It should be appreciated that the various components and features described herein may be incorporated in a system independently of the other components and features. For example, a system incorporating the teachings herein may include various combinations of these components and features. Thus, not all of the components and features described herein may be employed in every such system.

Different embodiments of the invention may include a variety of hardware and software processing components. In some embodiments of the invention, hardware components such as controllers, state machines and/or logic are used in a system constructed in accordance with the invention. In some embodiments, code such as software or firmware executing on one or more processing devices may be used to implement one or more of the described operations.

While certain exemplary embodiments have been described above in detail and shown in the accompanying drawings, it is to be understood that such embodiments are merely illustrative of and not restrictive of the invention. In particular, it should be recognized that the teachings of the invention apply to a wide variety of systems and processes. It will thus be recognized that various modifications may be made to the illustrated and other embodiments of the invention described above, without departing from the inventive scope. In view of the above it will be understood that the invention is not limited to the particular embodiments or arrangements disclosed, but is rather intended to cover any changes, adaptations or modifications which are within the scope and spirit of the invention.

What is claimed is:

1. A method for capturing expert knowledge and data comprising:
   receiving by a processing device expert knowledge and data entered via an editing device;
   storing the received expert knowledge and data into one or more tables of a database system, a first subset of the data being represented in the one or more tables as conclusion data, a second subset of the data being represented as observation data, and a third subset of the data being represented as relationship data; and
   generating by the processing device, based on the one or more tables, a probabilistic model that captures the entered expert knowledge and data, the probabilistic model including a structure of layers of nodes with at least one grouping layer disposed in-between a conclusion layer having a plurality of conclusion nodes designated as parent nodes and formed based on the stored conclusion data, and an evidence layer having a plurality of observation nodes designated as children nodes and formed based on the stored observation data, wherein a group node in the at least one grouping layer represents an aggregation of conclusions in two or more of the conclusion nodes in the conclusion layer, wherein the structure of layers of nodes includes directed arcs between the nodes based on the stored relationship data, with none of the directed arcs connecting two nodes in a same layer, and wherein at least one of the arcs is between the group node and at least one of the plurality of observation nodes,
   wherein, the generated probabilistic model is configured to be invoked by a reasoning engine for outputting probabilities of one or more conclusions or aggregation of the conclusions, in response to input observations, during a decision making process.

2. The method of claim 1, wherein each of the one or more tables is two-dimensional.

3. The method of claim 1, wherein the structure of layers of nodes further comprises one or more other directed arcs, each of the other directed arcs originating at a node of the conclusion layer and ending at a node of the evidence layer.

4. The method of claim 1, wherein the structure of layers of nodes further includes a plurality of grouping layers of increasing levels, and the structure of layers of nodes further comprises:
   a first set of one or more directed arcs, each directed arc of the first set originating at a node of the conclusion layer and ending at a node of a grouping layer of a first level;
   if there is more than one grouping layer, a second set of one or more directed arcs, each directed arc of the second set originating at a node of a first grouping layer of any level and ending at a node of a second grouping layer of any level, wherein the level of the first grouping layer is one less than the level of the second grouping layer; and
   a third set of one or more directed arcs, each directed arc of the third set originating at a node of the conclusion layer or at a node of any of the grouping layers, and ending at a node of the evidence layer.

5. A computer readable storage media embodying computer readable program code for execution by a processing device, the computer readable program code adapting the processing device for capturing expert knowledge and data, the computer readable program code comprising:
   receiving expert knowledge and data entered via an editing device;
   storing the received expert knowledge and data into one or more tables of a database system, a first subset of the data being represented in the one or more tables as conclusion data, a second subset of the data being represented as observation data, and a third subset of the data being represented as relationship data; and
   generating based on the one or more tables a probabilistic model that captures entered expert knowledge and data, the probabilistic model including a structure of layers of nodes with at least one grouping layer disposed in-between a conclusion layer having a plurality of conclusion nodes designated as parent nodes and formed based on the stored conclusion data, and an evidence layer having a plurality of observation nodes designated as children nodes and formed based on the stored observation data, wherein a group node in the at least one grouping layer represents an aggregation of conclusions in two or more of the conclusion nodes in the conclusion layer, wherein the structure of layers of nodes includes directed arcs between the nodes based on the stored relationship data, with none of the directed arcs connecting two nodes in a same layer, and wherein at least one of the arcs is between the group node and at least one of the plurality of observation nodes,
   wherein, the generated probabilistic model is configured to be invoked by a reasoning engine for outputting probabilities of one or more conclusions or aggregation of the conclusions, in response to input observations, during a decision making process.

6. The computer readable storage media of claim 5, wherein each of the one or more tables is two-dimensional.

7. The computer readable storage media of claim 5, wherein the structure of layers of nodes further comprises one or more other directed arcs, each of the other directed arcs originating at a node of the conclusion layer and ending at a node of the evidence layer.

8. The computer readable storage media of claim 5, wherein the structure of layers of nodes further includes a plurality of grouping layers of increasing levels, and the structure of layers of nodes further comprises:
   a first set of one or more directed arcs, each directed arc of the first set originating at a node of the conclusion layer and ending at a node of a grouping layer of a first level;
   if there is more than one grouping layer, a second set of one or more directed arcs, each directed arc of the second set originating at a node of a first grouping layer of any level and ending at a node of a second grouping layer of any level, the level of the first grouping layer being one less than the level of the second grouping layer; and
   a third set of one or more directed arcs, each directed arc of the third set originating at a node of the conclusion layer or at a node of any of the grouping layers, and ending at a node of the evidence layer.

9. A system for entering expert knowledge and data, comprising:
   an interface for editing one or more tables having expert knowledge and data for generating a probabilistic model, a first subset of the data being represented in the one or more tables as conclusion data, a second subset of the date being represented as observation data, and a third subset of the data being represented as relationship data;
   a database system coupled to the interface for storing the one or more tables;
   a processing device coupled to the database system, the processing device configured to execute program instructions, the program instructions including:
      generating based on the one or more tables a probabilistic model that captures the entered expert knowledge and data, the probabilistic model including a structure of layers of nodes with at least one grouping layer disposed in-between a conclusion layer having a plurality of conclusion nodes designated as parent nodes and formed based on the stored conclusion data, and an evidence layer having a plurality of observation nodes designated as children nodes and formed based on the stored observation data, wherein a group node in the at least one grouping layer represents an aggregation of conclusions in two or more of the conclusion nodes in the conclusion layer, wherein the structure of layers of nodes includes directed arcs between the nodes based on the stored relationship data, with none of the directed arcs connecting two nodes in a same layer, and wherein at least one of the arcs is between the group node and at least one of the plurality of observation nodes,
   wherein, the generated probabilistic model is configured to be invoked by a reasoning engine for outputting probabilities of one or more conclusions or aggregation of the conclusions, in response to input observations, during a decision making process.

10. The system of claim 9, wherein each of the one or more tables is two-dimensional.

11. The system of claim 9, wherein the interface provides at least one view corresponding to the conclusion layer of the probabilistic model and at least one view corresponding to the evidence layer of the probabilistic model.

12. The system of claim 9, wherein the interface includes a plurality of views displaying different degrees of detail.

13. The editor of claim 9, further comprising one or more tools for data sorting and/or data checking.

14. A method for generating probabilistic models, comprising:
   receiving by a processing device expert knowledge and data entered via an editing device;
   storing the received expert knowledge and data into one or more tables of a database system, a first subset of the data being represented in the one or more tables as conclusion data, a second subset of the data being represented as observation data, and a third subset of the data being represented as relationship data;

generating by the processing device a probabilistic model from the one or more tables comprising:

generating a structure of layers of nodes with at least one grouping layer disposed in-between a conclusion layer having a plurality of conclusion nodes designated as parent nodes and formed based on the stored conclusion data, and an evidence layer having a plurality of observation nodes designated as children nodes and formed based on the stored observation data, wherein a group node in the at least one grouping layer represents an aggregation of conclusions in two or more of the conclusion nodes in the conclusion layer, and generating, based on the stored relationship data, directed arcs only between nodes of non-identical layers, wherein at least one of the arcs is between the group node and at least one of the plurality of observation nodes, wherein, the generated probabilistic model is configured to be invoked by reasoning engine for outputting probabilities of one or more conclusions or aggregation of the conclusions, in response to input observations, during a decision making process.

15. The method of claim 14, wherein each of the one or more tables is two-dimensional.

16. The method of claim 14, further comprising assigning a value to each directed arc.

17. The method of claim 1, wherein the structure of layers of nodes includes a second grouping layer displayed in-between the at least one grouping layer and the evidence layer, wherein a second group node in the second grouping layer represents an aggregation of conclusions in two or more second conclusion nodes in the conclusion layer, wherein the structure includes a directed arc originating from the group node in the at least one grouping layer and ending in the second group node in the second grouping layer.

* * * * *